(No Model.)
W. A. WHITE.
MAT.
No. 441,785. Patented Dec. 2, 1890.
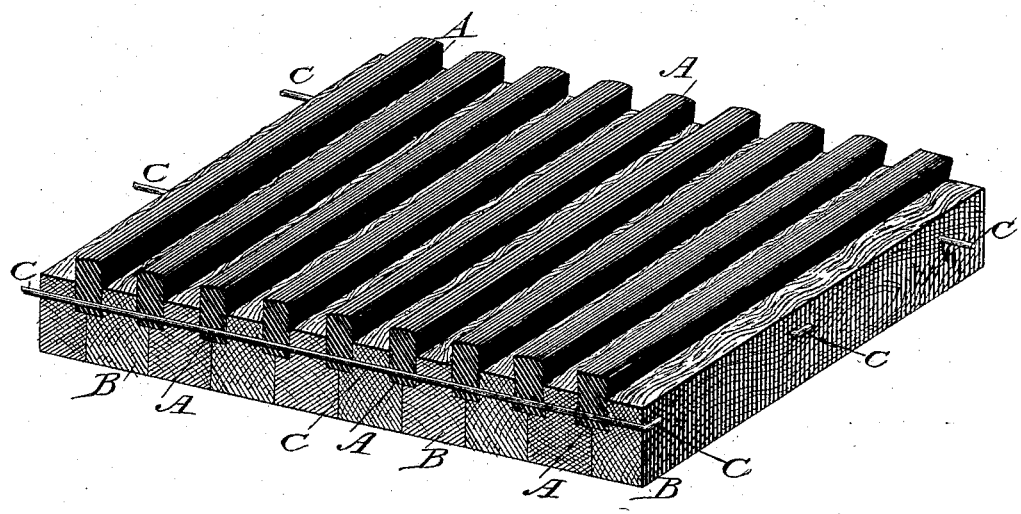
Witnesses.
David P. Thomas
Walter Ogden
Inventor.
William A. White
by H. S. Hoyt
his attorney.

UNITED STATES PATENT OFFICE.

WILLIAM A. WHITE, OF STAATSBURG, NEW YORK.

MAT.

SPECIFICATION forming part of Letters Patent No. 441,785, dated December 2, 1890.

Application filed March 28, 1890. Serial No. 345,657. (No model.)

*To all whom it may concern:*

Be it known that I, WILLIAM A. WHITE, a citizen of the United States, residing at Staatsburg, in the county of Dutchess and State of New York, have invented a new and useful Improvement in Mats, of which the following is a specification.

My invention relates to improvements in mats which are used more particularly as door-mats, but which as a matting may be put to any suitable use, and which are made of strips of rubber and wood or metal; and the objects of my improvements are to produce one that, first, is economical and durable; second, can be easily renewed in places where worn without renewing the whole, and can be easily repaired; third, is easily rolled up and is convenient for shipping, and, fourth, can be put together at a factory or store to fit any desired place. I attain these objects by taking the combination of a wood or metallic base with rubber rising above the base to receive the feet, the base and rubber being in strips, and fastening them together, as shown in the accompanying drawing, which shows a sectional view of a mat made of strips, and my method of fastening the strips of the base and of the rubber together by running wires through both the strips of the base and of the rubber.

Similar letters refer to similar parts throughout the drawing.

A A are the rubber strips, B B the strips forming the base, and C C the wires running through the strips of the base and of the rubber. The strips of the rubber and of the base may dovetail, the ends of the wires may be fastened in any convenient way, and other wires, if required, may be run through the strips of the base also.

It is seen that when a rubber strip is worn or a piece of the base broken the mat can be easily repaired by unstringing and inserting new strips for the damaged ones, and that the mat can be rolled for shipping, slightly separating the strips, if necessary, and can be made and put together at a factory, of a shape ordered, and be easily put down, and also that broken parts can be ordered by simply giving the length of the strips wanted.

I am aware that the strips of such mats have been held together by running stiff bolts through the strips of the base, and also that the plates of a base have been hinged or pivoted together; but in the first the bolts are large and the mat cannot be rolled, and in the second the rubber is not held by the hinges and the hinging or pivoting is expensive.

I am aware that corrugated rubber is used as a matting.

What I claim, and desire to secure by Letters Patent, is—

The combination, in a mat, of strips of wood or metal forming the base and strips of rubber forming ridges on the top of the base, with wires running through the strips of the base and of the rubber, all substantially as shown, and for the purposes specified.

WILLIAM A. WHITE.

Witnesses:
JOHN HACKETT,
ALLISON BUTTS.